(12) United States Patent
Capolupo

(10) Patent No.: US 12,150,504 B2
(45) Date of Patent: Nov. 26, 2024

(54) DEVICES, METHOD AND KITS FOR REDUCING TRANSMISSION OF FECAL PATHOGENS

(71) Applicant: Wayne P. Capolupo, Salisbury, MA (US)

(72) Inventor: Wayne P. Capolupo, Salisbury, MA (US)

( * ) Notice: Subject to any disclaimer, the term of this patent is extended or adjusted under 35 U.S.C. 154(b) by 0 days.

(21) Appl. No.: 16/823,909

(22) Filed: Mar. 19, 2020

(65) Prior Publication Data

US 2021/0289859 A1   Sep. 23, 2021

(51) Int. Cl.
*A41D 19/015* (2006.01)
*A41D 13/00* (2006.01)

(52) U.S. Cl.
CPC .................. *A41D 19/015* (2013.01)

(58) Field of Classification Search
CPC .............. A41D 19/015; A41D 2400/52; A41D 2500/30; A41D 19/00
See application file for complete search history.

(56) References Cited

U.S. PATENT DOCUMENTS

| | | | |
|---|---|---|---|
| 766,554 A | 8/1904 | Stut | |
| 4,002,785 A * | 1/1977 | Grossmann | D04H 1/587 |
| | | | 524/217 |
| 5,312,197 A * | 5/1994 | Abramson | A46B 11/00 |
| | | | 401/11 |
| 5,473,789 A * | 12/1995 | Oster | A47L 13/19 |
| | | | 15/104.94 |
| 5,629,081 A * | 5/1997 | Richards | D06M 15/333 |
| | | | 424/404 |
| 5,801,116 A * | 9/1998 | Cottrell | C08L 5/14 |
| | | | 502/402 |
| 6,258,196 B1 * | 7/2001 | Suzuki | D04H 3/14 |
| | | | 156/308.2 |

(Continued)

FOREIGN PATENT DOCUMENTS

| | | | | |
|---|---|---|---|---|
| WO | WO-2008155078 A1 * | 12/2008 | | B08B 7/0014 |
| WO | WO2019/239087 | * 12/2019 | | A47L 13/16 |

OTHER PUBLICATIONS

Mayo Clinic, "Cryptosporidium Infection", Mayo Clinic, Dec. 12, 2019 (Dec. 12, 2019), [retrieved on Dec. 5, 2021]. Retrieved from the Internet, <URL:https://www.mayoclinic.org/diseases-conditions/cryptosporidium/symptoms-causes/syc-20351870> entire document, pp. 1-4.

(Continued)

*Primary Examiner* — Robert H Muromoto, Jr.
(74) *Attorney, Agent, or Firm* — Brown Rudnick LLP; Adam M. Schoen

(57) ABSTRACT

Devices, kits and methods are provided to reduce or even eliminate fecal contamination and cross-contamination and transmission of fecal-born pathogenic organisms by users employed in the food production and food preparation industries or users in a home, for example in restaurants, cruise ships, schools, hospitals, dormitories, transportation means and terminals, and government buildings, the devices and methods pertaining to a glove-like garment that is applied prior to disposal of feces and removed after disposal of toilet tissue. The glove is flushable, and in an embodiment includes means of retraction from the wrist area for inversion of the garment, followed by flushing the inverted removed glove.

9 Claims, 3 Drawing Sheets

(56) References Cited

U.S. PATENT DOCUMENTS

| | | | |
|---|---|---|---|
| 6,516,469 B1 | 2/2003 | Schaetzel | |
| 7,725,979 B1* | 6/2010 | Held | A47K 7/03 |
| | | | 15/104.94 |
| 9,516,906 B1* | 12/2016 | Wiggins | B65D 83/0847 |
| 9,694,388 B2* | 7/2017 | Curran | D06M 13/513 |
| 10,689,531 B2* | 6/2020 | McJunkins | C01F 11/185 |
| 2001/0051796 A1* | 12/2001 | Noda | A61F 13/47 |
| | | | 604/374 |
| 2004/0221367 A1* | 11/2004 | Darrow | A41D 19/0075 |
| | | | 2/167 |
| 2004/0225052 A1* | 11/2004 | Bialke | C08F 290/062 |
| | | | 526/319 |
| 2005/0111898 A1 | 5/2005 | Barton et al. | |
| 2005/0125877 A1 | 6/2005 | Benjamin et al. | |
| 2006/0240728 A1* | 10/2006 | Price | C11D 3/28 |
| | | | 429/102 |
| 2008/0104736 A1* | 5/2008 | Legaard | A41D 19/00 |
| | | | 2/167 |
| 2009/0144925 A1* | 6/2009 | Orffeo | A47L 13/18 |
| | | | 15/227 |
| 2014/0342098 A1* | 11/2014 | Curran | B05D 5/083 |
| | | | 427/430.1 |

OTHER PUBLICATIONS

Mayo Clinic, "*Salmonella* Infection", Mayo Clinic, Oct. 11, 2019 (Oct. 11, 2019), [retrieved on Dec. 5, 2021], Retrieved from the Internet <URL:https://www.mayoclinic.org/diseases-conditions/salmonella/symptoms-causes/syc-20355329> entire document, pp. 1-7.

Notification of Transmittal of the International Search Report and the Written Opinion of the International Searching Authority, or the Declaration, PCT/US2021/021857, May 28, 2021, pp. 1-12.

Novakovi, "What to Know about Noroviurs" Feb. 14, 2020 (14.20.2020), Medical News Today, [retrieved on May 13, 2021], Retrieved from the Internet <URL: https://www.medicalnewstoday.com/articles/179107> entire document, pp. 1-19.

* cited by examiner

DEVICES, METHOD AND KITS FOR REDUCING TRANSMISSION OF FECAL PATHOGENS

FIELD OF THE INVENTION

An embodiment of the invention provides a flushable glove for disposal of fecal cleaning materials, and methods of using, and kits.

BACKGROUND

Enormous strides were made in the 19th century in public health when it was proved that a cholera epidemic in London could be halted by removal of a handle of a water pump. Yet diseases that are transmitted by fecal contamination remain a problem even in advanced societies, especially in locations having large numbers of human or animal subjects. Typhoid Mary was a food preparation worker in New York City spreading *Salmonella* bacteria to customers. The playwright Ibsen described difficulty of convincing members of the public of the importance of reliable access to water free of pathogens.

Recent events show that fecal contamination is far from a solved problem, as clusters of norovirus disease profoundly affecting the cruise industry, bacterial diseases entering the food supply through, for example, ground beef (*Escherichia coli* H1557:011) and Romaine lettuce, and corona virus transmitted by plumbing lacking J joints to prevent mixing of efflux and incoming fresh water as in COVID-19. While this latter pathogen causes pneumonia type symptoms and affects cells of the respiratory system, it is likely found generally in body fluids and feces, as is Norovirus and various virus causative agents of gastroenteritis.

A variety of commercially available wet wipes are disposable, for example, Lysol® disinfecting wipes of which the active ingredient is 0.26% alkyl dimethyl benzyl ammonium chloride and which describes killing 99.9% viruses and bacteria; Lysol® citrus scent 4 in 1 disinfecting wipes, the actives ingredients of which is dimethyl benzyl ammonium chloride 0.32%, which indicates to dispose of wipe in trash; CVS Multi-surface wipes; and Chlorox™ which states to dispose in trash after use, do not flush. These products are generally offered for use on surfaces around home and office, while use for human hygiene is discouraged, nor are these products intended for disposal by flushing into indoor plumbed toilets.

There is an urgent need for novel devices and methods to contain and reduce and eliminate dissemination of disease vectors for use by anyone involved in the food chain, including food production and food preparation, for example those employed in agriculture, restaurants, cruise ships, home health care, hospitals, and school employees as well as for any venue involving food preparation for large numbers of members involving the general public, to reduce incidence of direct contamination of food, including cross-contamination by clothing, surfaces and sources of water.

SUMMARY

An aspect of the invention provides a device for reducing or eliminating contamination, cross-contamination and transmission of fecal pathogens and fecal material, the device in this embodiment is a flushable glove- or mitten-type garment that includes a covering for five digits and palm of a hand of a user, the device made from a non-woven wood-pulp based fabric, and having a dorsal surface and a ventral surface joined by any of stitching with a degradable thread, a water soluble glue, or bonding, and optionally further having at least one of an emollient, a perfume, and an anti-microbial agent. Accordingly, the device further includes a means for removal and retraction of the device for grasping with fingers of a non-gloved hand, so that it can be conveniently and easily pulled from the gloved hand.

The means of removal and retraction include in various embodiments, at least one feature located at a margin of the fabric distal from the digits, i.e., at what may be considered the hem of the garment, the feature is at least one of: a tab, a cuffable hem extending beyond a palm portion, a string, and a band. For example, the means of removal which is the tab is an extension of the fabric of the glove. In an alternative or additional embodiment, the means of removal is the fabric further extending up the arm and so enclosing wrist and back of hand of the user, the cuffable hem of the device being fabric that is wider circumferentially than the fabric at the wrist. In this embodiment the fabric extends to a region that is distal from the digits, or fingers, to beyond a portion of forearm, beyond the wrist.

Embodiments of the device include a plurality of sizes, for example, small to fit children, medium, large, and extra-large. The fabric of the device in various embodiments includes at least 70%-95% wood pulp and further contains at least 5%-30% of a natural fiber selected from at least one of cotton, hemp, and flax, or a synthetic fiber. The fabric in various embodiments includes a certain percentage of polyvinyl alcohol as a bonding agent which further promotes dissolution as a function of time in water after disposal by flushing. The optional emollient is for example one or more of aloe, almond oil, olive oil, keratin, lanolin, collagen, grapeseed oil, and retinol. The optional anti-microbial agent is for example one or more of a broad spectrum antibacterial antibiotic and/or an antimicrobial chemical agent such as Chlorox® which would act against not merely bacterial cells but also viruses, fungi and protozoa.

Another aspect of the invention provides a method of reducing or eliminating transmission of a fecal pathogen and fecal material by human subjects in toilets in a health care facility, and toilets convenient to a facility that is part of a chain of food production and food preparation, the method having the steps of:

providing a plurality of devices described herein including a disposable garment encompassing a dorsal and ventral closed covering for five digits and palm of a hand, the garment extending at least to the wrist and optionally beyond the wrist to the forearm, the device being made of a material compatible with standards for indoor plumbing disposal, and the dorsal surface and ventral surface joined by any of a sewn seam with a degradable thread, glue which is water soluble, and bonding for example with heat;

instructing subjects for using a single device for each occurrence of a fecal elimination or a defecation event, including after disposing of toilet paper or toilet tissue, removing from the hand by inverting the device into a toilet and flushing for disposal; and, optionally analyzing compliance with use and correlating extent of use with reducing or eliminating transmission of the fecal pathogen.

The method is envisioned as an additional step to promote public health and hygiene and not as a substitute or alternative to current standards of toilet behavior. Public toilets generally do not allow for immediate handwashing prior to resuming a fully dressed condition, as sinks in public facilities are removed from toilet booths or stalls. Even in certain contemporary architectural styles, toilets may not be immediately adjacent to or convenient to a sink, and a toilet in for example a basement of an antique house may not be adjacent to a sink. Accordingly, the method includes providing the device by supplying at least one of a plurality of different sizes of the device adjacent within a user's arm's reach of a toilet bowl, within the stall or the booth, or the home toilet.

A variety of pathogens are present in fecal material, even if fecal transmission is not the major route of communicability. Various embodiments of the method are envisioned to reduce transmission of the pathogen which is at least one of a strain of a virus, a protozoan, a fungus such as the causative agent of thrush, or a bacterium. For example, the virus is any of all of a norovirus, meningitis, astrovirus, sapovirus, coronavirus, a Coxsackie virus, a hepatitis, and a rotavirus strain. Similarly, embodiments of the method are envisioned to reduce transmission of a bacterial species which is one or more of a species of: a *Vibrio*, a *Clostridium*, a *Campylobacter*, a *Salmonella*, a *Shigella*, a *Pseudomonas*, a *Yersinia*, and an *Escherichia*, or one or more of a protozoan species of a *Cryptosporidium*, a *Leishmania*, a *Giardia*, and an *Entamoeba*.

The method in various embodiments is designed for users involved in food production or food preparation, for example, a facility is located within a context of: a food store; a restaurant, a cruise ship, a hospital, a day care center for children, a day care center for elderly, a day care center for pets, a hotel, a school building, a military barracks, a government administration building, a courthouse, a dormitory, a group residence, a seasonal agriculture worker dwelling, a halfway house, a transportation hub terminal, a nursing home, a senior center, a sports arena, a performance venue, a museum, a shopping mall, a bar, a restaurant, a food court, a department store, a cathedral, a shrine, a fraternity house, a sorority house, and a boarding school. The method in various embodiments is designed for users in a health care facility, for example, a hospital, a clinic, a dentist office, an optometry office, a veterinary office, and a veterinary hospital. It is envisioned that the method includes use of the device prior to resuming a fully clothed condition, i.e., replacing underwear and trousers, or replacing underwear and arranging a skirt, so that cross-contamination of clothing including underwear and outerwear by fecal material is reduced and even eliminated. In a public facility, the user would upon becoming fully clothed proceed from a booth or stall as usual to the sink area and wash hands with soap and warm water prior to leaving the toilet area.

Another aspect of the invention described herein provides a kit for improving personal hygiene sanitation which includes a device which is a disposable flushable garment encompassing a covering for five digits and palm of a hand, the device comprising a material compatible with standards for indoor plumbing disposal, and having a dorsal surface and a ventral surface joined by stitching of with a degradable thread, and instructions for use; and, instructions on the device informing the user on proper timing of and route of disposal. The instructions for use include informing the user to apply the device to at least one hand prior to a standard cleaning function, i.e., use of toilet paper or toilet tissue, following upon defecation but before cleaning, thus obtaining a length of toilet paper or a sheet of toilet tissue and cleaning after defecation, then removing the device by inverting the device from the outer surface to eject the hand after the cleaning function and after releasing the toilet paper or tissue into the toilet by the band having the device, and disposing of the device by dropping into the plumbing system and flushing. Once saturated with water, the device disperses as a function of time. The kit for reducing transmission of fecal pathogens and fecal material has the device and instructions for use which may be printed directly on the device or printed on the box containing a set of the devices or the instructions are printed on both.

DETAILED DESCRIPTION

Flushable wipes are commercially available in the shape of squares or rectangles, for example, U.S. Pat. No. 5,629, 081 shows wipes that are made from non-woven fibers with polyvinyl alcohol as binder. These are "dispersable", as the wipes break apart in water. The composition is 75%-95% cellulose wood pulp with 5%-25% textile fibers. Lotion and preservative and anti-microbials are added, and the pH is adjusted to alkaline. U.S. Pat. No. 8,668,808 uses fiber with greater than 70% wood pulp, with the remaining components being man made or natural fibers. The wet weight is 40-100 g/m$^2$. Polyvinyl alcohol concentrations and amounts are varied to adjust for rates of dissolution and temperatures of effluents, see for example U.S. Pat. No. 7,509,690 issued Mar. 31, 2009. Methods of making flushable materials are described in U.S. Pat. No. 8,668,808 issued Mar. 11, 2014. All references cited herein are hereby incorporated by reference herein in their entireties. Rates of dissolution are enhanced by chemical additives such as oxidizing agents as described in U.S. Pat. No. 6,623,643 issued September 2003.

In most public toilets the act of defecation occurs in a separate compartment, so that upon completion of the act of defecation a subject must resume a fully dressed condition prior to hand washing. This process may cross-contaminate clothing and surfaces such as door handles, doors, faucet handles, and soap dishes and dispensers.

Figure 1:
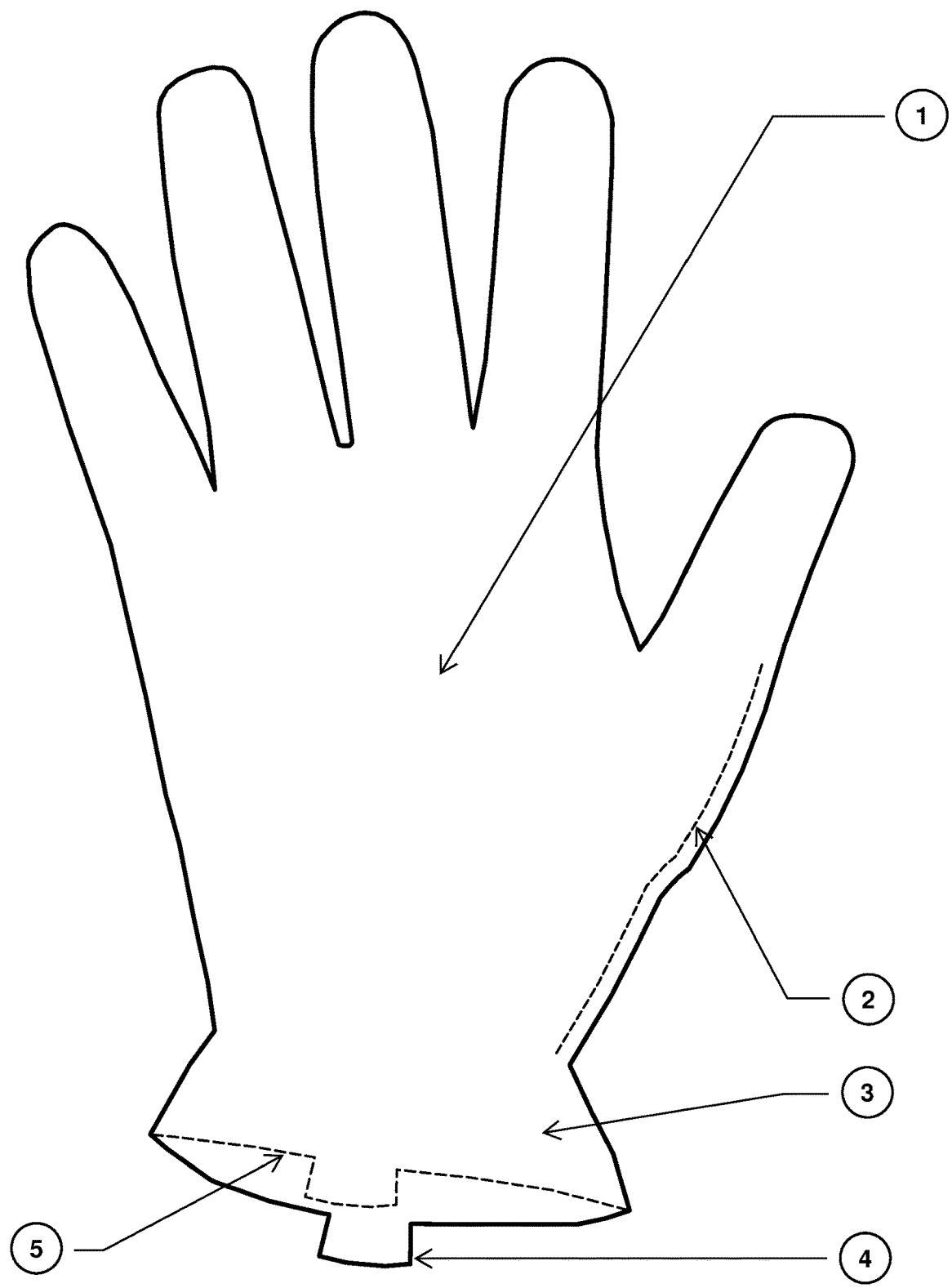
FIG. 1 is a top view of a device of the invention showing a flushable glove, 1, having a top and bottom sewn together with flushable thread, the stitches, 2, shown as discontinuous lines because the stitched seam is on the inside of the glove; a broadened cuff, 3, and a tab, 4, the cuff and tab being alternatives for grasping by the other hand for the purpose of removing the glove, here shown together. The cuff extends beyond the narrow portion of the wrist and is broader than the arm for convenient grasping. The tab, 4, or a string or a band, may be used with an embodiment of the glove that terminates at the wrist and lacks a cuff. The glove as shown in FIG. 1 is used, if emplaced on the right hand, with the tab on the palm side, so the user pulls the glove off with palm up away from the core of the body, or with the left hand with the tab on the top. The cuff, 3, is illustrated as symmetrically arrayed on the entire circumferential end of the glove, so as worn on either hand and accordingly can be grasped with the other hand. In an embodiment of the device which is a glove or a mitten having the broadened cuff for removal, the glove can be worn on either hand and the method of removal is the same for each gloved hand by the corresponding non-gloved hand. In alternative embodiments, a universal glove that fits either hand, and a left hand specific and a right hand specific glove, are provided commercially.
Figure 2:
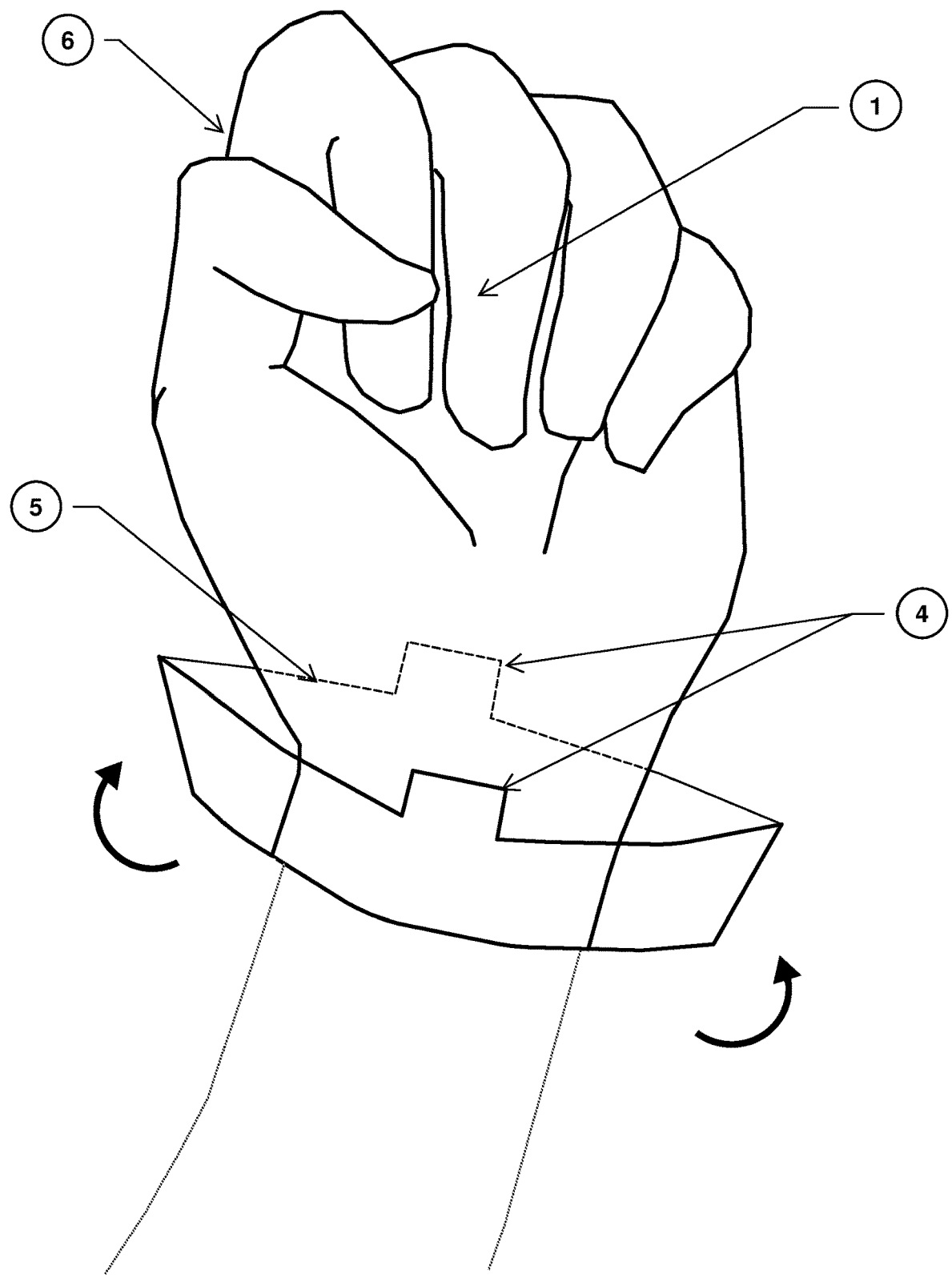
FIG. 2 is a partial back and partial side view of an embodiment of a glove, 1, with the thumb and finger of the user curved for the purpose of grasping toilet tissue to be deposited into the toilet, 6, and a broadened cuff, 4, the glove is shown having been partially retracted in the process of removal of the glove after disposal of the toilet tissue, after which the glove is in process of removal by peeling off the hand, which inverts the glove so that the potentially soiled surface is enclosed by the clean inner surface, for disposal by the user depositing into the toilet and flushing. These motions are completed adjacent to the toilet and prior to completing replacing clothing to attain a fully dressed condition, which reduces or eliminates contamination of clothing by fecal material. In this view the cuff is shown with two tabs, one on the back of the hand, the other shown in discontinuous lines at the palm of the hand, so that the user of this embodiment has a choice of a front tab, a back tab and the broadened cuff. It is envisioned that alternative embodiments include a glove with cuff only and no tabs, a glove with one tab or with more than one tab with or without a broadened cuff.
Figure 3:
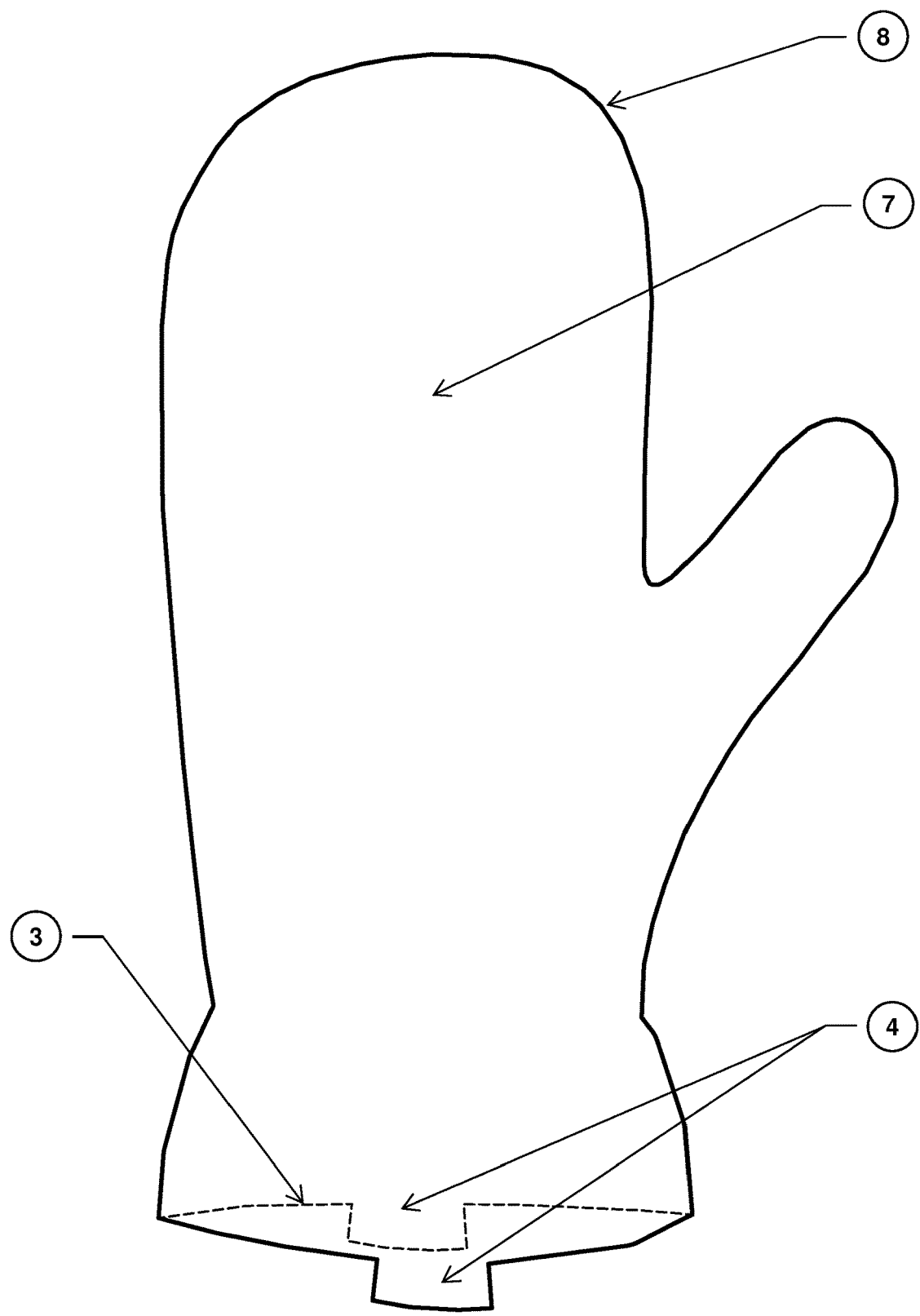
FIG. 3 is a top view of an embodiment of the glove which is a mitten, 7, lacking individual pockets for each of four fingers, rather having a large pocket for four fingers, 8, and a side pocket for a thumb. The mitten in various alternative embodiments includes for efficiency of removal purposes, at least one of a broadened cuff, 3, and a tab, 4 located on the back or the front of the mitten. The mitten can be worn on either hand, or a left hand and a right hand specific mitten are provided.

The gloves or mittens, respectively, of the present invention are manufactured first by being cut from a two ply layer in the shape of the hand, with separate pockets for each of the five digits or with one pocket for four fingers and a separate pocket for the thumb, respectively. See FIGS. 1 and 3. The step of cutting during manufacture need not be limited to two layers, machine cutting can be used for a substantial stack, however the final product is made from two sheets or layers cut in the shape of a glove or a mitten. A plurality of sizes of gloves are cut, affording a good fit for those having small hands, for example, children, to those having very large hands, such as basketball players or pianists. The two layers in certain embodiments are entirely superimposable. In alternative embodiments, one layer for example cut from a stack of the layers optionally has a greater length from fingertip to wrist edge, to serve as a convenient cuff, or has an additional area beyond a straight edge, to serve as a tab. The length of the glove from fingertip to wrist end in certain embodiments extends to a portion of the forearm, for example one to several inches beyond the narrow portion of the wrist, or in an alternative embodiment ends at the wrist, or ends at the base of the thumb. The ventral or "underside" or palm side of the glove in contact with the palm in certain embodiments is longer than the top side, or dorsal layer, for the purpose of protecting the enclosed palm of the hand including the fingers from contamination by fecal material. Protection from fecal contamination reduces and potentially eliminates contamination and cross-contamination of any object in proximity of the user, including not merely food and water but also clothing and subsequent contact with surfaces, thereby reducing both direct contamination and reducing cross-contamination at a later interval of time.

In using the embodiment of the device having a cuff, a tab, a band or a string for facilitating removal from the hand, it is envisioned that many users preferentially would pull by grasping the cuff, tab or the string at the wrist ventral surface, adjacent to the palm of the hand, thereby pulling away from the body for dropping into a toilet. Alternatively a user might prefer to pull the cuff located on the dorsal surface of the hand, adjacent to the back of the hand, by holding the hand palm down, dropping toilet paper or tissue into the toilet prior to removing the glove or mitten, then continuing to hold the hand palm downward while standing adjacent to the toilet, the hand held over the toilet, to release the glove or mitten into the toilet to be flushed. Alternatively the hand is emplaced behind the user while sitting and the cuff, tab or string is grasped behind the back, for example, at the wrist surface. For this reason an embodiment of the cuff that is broader than the wrist portion is symmetrically arrayed around the entire circumference of the glove. In another embodiment, a tab is manufactured to be available on both the top or bottom surfaces of the glove; or in another embodiment, a string or a broad band is added to a surface of the glove adjacent to the thumb, of a right handed or a left handed glove, depending on the user's preference.

The two layers are manufactured either as identical superimposable pieces to be sewn together to form a glove, or are separately cut then paired together and sewn to form a glove. The seams are sewn with a dispersible thread which is flushable and dissolves with time in the aqueous environment, so that the entire glove is dispersible after a length of time in the aqueous environment. Dispersion may be aided by the presence of enzymes, chemicals, and/or micro-organisms if the glove is flushed into an environment that can be controlled such as a septic tank. Rates of dispersion are shown in the references cited herein, which are hereby incorporated by reference in their entireties.

The seams attaching the sides of the glove in certain embodiments terminate proximal to the fingers rather than extending the full length of the device, before reaching the wrist end, for ease in forming a cuff following use. A user applies the glove upon entering the toilet booth prior to removing clothing or underclothing, or up until the time after releasing feces into the toilet, but for optimal function the glove is applied prior to the user initiating standard cleaning functions of wiping genital, perineum and anal areas. Depending on preference, a glove is applied to one or both hands, generally one hand is envisioned to be sufficient however both hands may be gloved. The cleaning function is achieved as is commonly performed, with tissue or toilet paper or a disposable wipe, which is for the cleaning motions held within flexed fingers of a gloved hand and the tissue or paper is dropped into the toilet prior to removal of the glove. After dropping the toilet paper or tissue, the non-gloved hand is used to remove the glove, for example by grasping the wrist end and retracting the cuff so that the glove is removed and inverted, or turned inside out, the outside of the glove that was in contact with the soiled tissue or toilet paper now enclosed within the inverted glove which is then released into the toilet and flushed. The user now having clean hands, is able to raise their undergarments or pants without risk of cross-contaminating their clothing, allowing them to proceed to the sink area for standard handwashing, subsequent to which they may return to work or other life activities secure in the absence of fecal matter inadvertently deposited on their person.

It is envisioned that users may prefer to grasp the wrist end of the glove, viz, the tab or cuff or other means of removal, located on the dorsal hem, or top of the hand side, of the glove. Alternative, other users may prefer to grasp the edge on the inner surface of the wrist, or ventral surface. Both usages are within the scope of the devices and methods described herein.

Polyvinyl alcohol concentrations and amounts are varied to adjust for rates of dissolution and temperatures of effluents, see for example U.S. Pat. No. 7,509,690 issued Mar. 31, 2009. Methods of making such materials are described in U.S. Pat. No. 8,668,808 issued Mar. 11, 2014.

What is claimed is:

1. A device for reducing or eliminating contamination, cross-contamination and transmission of fecal pathogens and fecal material, the device comprising a flushable glove- or mitten-type garment encompassing a covering for five digits and palm of a hand of a user, wherein the flushable glove- or mitten-type garment consists of: (i) a non-woven wood-pulp based fabric making up at least 70%-95% wood pulp, (ii) at least 5%-30% of a natural fiber selected from at least one of cotton, hemp, and flax, (iii) a binder consisting of polyvinyl alcohol within the non-woven wood-pulp based fabric which dissolves the device in an aqueous environment, and (iv) a degradable thread that joins together discrete surfaces of the flushable glove- or mitten-type garment.

2. The device according to claim 1, further comprising a means for removal and retraction of the device for grasping with fingers of a non-gloved hand.

3. The device according to claim 2, wherein the means of removal and retraction comprises at least one feature located at a margin of the fabric distal from the digits, the feature at least one selected from: tab, a cuffable hem extending beyond a palm portion, a string, and a band.

4. The device according to claim 3, wherein the tab is an extension of the fabric of the glove.

5. The device according to claim 3, the fabric further enclosing wrist and back of hand of the user, the cuffable hem of the device being fabric that is wider circumferentially than the fabric at the wrist.

6. The device according to claim 1, the fabric further extending from the digits beyond a portion of forearm, distally beyond the wrist.

7. The device according to claim 1, the fabric further comprising a synthetic fiber.

8. The device according to claim 7, the fabric further comprising sufficient polyvinyl alcohol as the binder which dissolves in the aqueous environment.

9. A kit for improving personal hygiene sanitation comprising:
   a device comprising a disposable flushable garment encompassing a covering for five digits and palm of a hand, the wherein the flushable glove- or mitten-type garment consists of: 70%-95% wood pulp, (ii) 5%-30% of a natural fiber selected from at least one of cotton, hemp, and flax, (iii) a binder consisting of polyvinyl alcohol within the non-woven wood-pulp based fabric which dissolves and disperses material in an aqueous environment thereby being compatible with standards for indoor plumbing disposal, and (iv) a degradable thread that joins together discrete surfaces of the flushable glove- or mitten-type garment; and
   instructions for use for glove disposal following elimination of fecal material.

* * * * *